United States Patent
Pichon et al.

(10) Patent No.: US 12,084,884 B2
(45) Date of Patent: Sep. 10, 2024

(54) DEVICE FOR EXTRACTION OF A SWIMMING POOL CLEANING DEVICE

(71) Applicant: ZODIAC POOL CARE EUROPE, Bron (FR)

(72) Inventors: Philippe Pichon, Villeneuve de Riviere (FR); Simon Duffaut, Castelginest (FR); Philippe Blanc-Tailleur, Toulouse (FR)

(73) Assignee: ZODIAC POOL CARE EUROPE, Belberaud (FR)

( * ) Notice: Subject to any disclaimer, the term of this patent is extended or adjusted under 35 U.S.C. 154(b) by 0 days.

(21) Appl. No.: 17/108,696

(22) Filed: Dec. 1, 2020

(65) Prior Publication Data

US 2021/0108432 A1 Apr. 15, 2021

Related U.S. Application Data

(62) Division of application No. 15/306,379, filed as application No. PCT/FR2016/052655 on Oct. 14, 2016, now Pat. No. 10,876,315.

(30) Foreign Application Priority Data

Oct. 14, 2015 (FR) ...................................... 1559779

(51) Int. Cl.
*E04H 4/14* (2006.01)
*B60M 7/00* (2006.01)
*E04H 4/16* (2006.01)

(52) U.S. Cl.
CPC ............... *E04H 4/144* (2013.01); *B60M 7/00* (2013.01); *E04H 4/1654* (2013.01)

(58) Field of Classification Search
CPC ........ B60M 7/00; E04H 4/144; E04H 4/1654; E04H 4/082; E04H 4/101; B63B 27/143;
(Continued)

(56) References Cited

U.S. PATENT DOCUMENTS 4,141,089 A 2/1979 Krumbeck
4,601,606 A * 7/1986 Eason ....................... B63C 3/02
414/571

(Continued)

FOREIGN PATENT DOCUMENTS

EP 2860329 4/2015
WO 03061850 7/2003

(Continued)

OTHER PUBLICATIONS

U.S. Appl. No. 15/306,379, Advisory Action, mailed on Apr. 12, 2019, 2 pages.
U.S. Appl. No. 15/306,379, Advisory Action, mailed on Nov. 13, 2019, 5 pages.
U.S. Appl. No. 15/306,379, Corrected Notice of Allowability, mailed on Nov. 17, 2020, 4 pages.
U.S. Appl. No. 15/306,379, Final Office Action, mailed on Aug. 13, 2020, 10 pages.

(Continued)

*Primary Examiner* — Zachary L Kuhfuss
(74) *Attorney, Agent, or Firm* — Kilpatrick Townsend & Stockton LLP

(57) ABSTRACT

A device for extraction of a swimming pool cleaning robot from water or for putting the swimming pool cleaning robot into water includes a support frame and a plate. The plate can be deployed relative to the support frame beyond the support frame and below the support frame. Deployment of the plate relative to the support frame may be controlled.

14 Claims, 3 Drawing Sheets

(58) Field of Classification Search
CPC .............. B63B 35/40; B63B 2027/165; B63B 2708/00; B63B 27/36; B63B 2205/06; B60P 1/43; B60P 1/6454; B60P 1/00; B60P 1/433; B60P 1/435; B60P 3/06; B60R 9/06; B08B 3/04
USPC .......................................................... 15/1.7
See application file for complete search history.

(56) References Cited

U.S. PATENT DOCUMENTS

| | | | | |
|---|---|---|---|---|
| 5,184,913 | A * | 2/1993 | Meriwether | B63C 3/12 |
| | | | | 405/1 |
| 5,641,242 | A * | 6/1997 | Riviere | B63C 3/06 |
| | | | | 114/263 |
| 6,565,293 | B2 * | 5/2003 | Desmoulins | B23Q 17/0961 |
| | | | | 408/124 |
| 6,616,396 | B2 | 9/2003 | Sternberg | |
| 10,876,315 | B2 | 12/2020 | Pichon et al. | |
| 2002/0081184 | A1 | 6/2002 | Sternberg | |
| 2010/0122406 | A1 | 5/2010 | Gschwind | |
| 2011/0008140 | A1 | 1/2011 | Hansen et al. | |
| 2011/0067615 | A1 | 3/2011 | Rooney, III et al. | |
| 2012/0321420 | A1 * | 12/2012 | Mears | B60P 3/122 |
| | | | | 414/800 |
| 2014/0123379 | A1 | 5/2014 | Reid | |
| 2014/0263087 | A1 | 9/2014 | Renaud et al. | |
| 2018/0208278 | A1 * | 7/2018 | Klebanov | B63H 5/02 |

FOREIGN PATENT DOCUMENTS

| | | |
|---|---|---|
| WO | 03087501 | 10/2003 |
| WO | 2012135538 | 10/2012 |
| WO | 2016196169 | 12/2016 |

OTHER PUBLICATIONS

U.S. Appl. No. 15/306,379, Final Office Action, mailed on Sep. 23, 2019, 11 pages.
U.S. Appl. No. 15/306,379, Final Office Action, mailed on Mar. 6, 2019, 9 pages.
U.S. Appl. No. 15/306,379, Non-Final Office Action, mailed on Dec. 21, 2018, 10 pages.
U.S. Appl. No. 15/306,379, Non-Final Office Action, mailed on Jul. 15, 2019, 10 pages.
U.S. Appl. No. 15/306,379, Non-Final Office Action, mailed on Mar. 9, 2020, 9 pages.
U.S. Appl. No. 15/306,379, Notice of Allowance, mailed on Sep. 22, 2020, 9 pages.
French Application No. FR1559779, French Search Report, mailed on Aug. 8, 2016, 7 pages.
French Application No. FR1559779, Notice of Decision to Grant, mailed on Sep. 8, 2017, 1 page.
International Application No. PCT/FR2016/052655, International Preliminary Report on Patentability, mailed on Apr. 26, 2018, 8 pages.
International Application No. PCT/FR2016/052655, International Search Report and Written Opinion, mailed on Jan. 26, 2017, 21 pages.
Australian Application No. 2021200724, First Examination Report mailed on Sep. 29, 2021, 10 pages.
DIY Handicapped Pool Entry & Exit Slide, YouTube, Available online at: https://www.youtube.com/watch?v=cjjdnhwu7SU, Aug. 11, 2014, 3 pages.
Australian Application No. 2021200724, Second Examination Report mailed on Jun. 8, 2022, 6 pages.
Australian Application No. 2022241528, First Examination Report mailed on May 3, 2024, 7 pages.

* cited by examiner

DEVICE FOR EXTRACTION OF A SWIMMING POOL CLEANING DEVICE

CROSS-REFERENCE TO RELATED APPLICATIONS

This is a divisional of U.S. patent application Ser. No. 15/306,379, titled "Device for Extraction of Swimming Pool Cleaning Device" and filed Oct. 24, 2016, which is a U.S. national phase under 35 U.S.C. 371 of International Patent Application No. PCT/FR2016/052655, titled "Dispositif D'Extraction D'Un Appareil Nettoyeur de Piscine" and filed Oct. 14, 2016, which claims priority to and benefit of French Patent Application No. 1559779, titled "Dispositif D'Extraction D'Un Appareil Nettoyeur de Piscine" and filed Oct. 14, 2015, the entirety of all of which applications is incorporated herein by reference.

The present invention relates to the field of equipment for swimming pools. More particularly, it concerns a device for extraction of a swimming pool cleaning device from water, or for putting it into water.

PREAMBLE AND PRIOR ART

The invention concerns equipment which facilitates the implementation of a surface cleaning device submerged in a liquid, such as a surface formed by the walls of a pool, in particular a swimming pool. A cleaning device of this type is commonly a mobile swimming pool cleaning robot. These swimming pool robots have replaced the regular, or even daily, task of cleaning the bottom and walls of a swimming pool, which swimming pool users were previously obliged to carry out.

Swimming pool cleaning robots of this type travel along the bottom and optionally the lateral walls of a swimming pool, removing the debris, dust or particles adhering to the walls by means of brushes and a water suction circuit comprising a filter. Their travel on the bottom of the pool is automatic, and is optimised to clean the complete surface during a cleaning cycle of approximately one to two hours. These autonomous robots have provided swimming pool users with significant convenience. A swimming pool robot according to the prior art, as has just been described, is illustrated in FIG. 1.

At regular intervals, or generally at the end of a cleaning cycle, it remains necessary to remove the cleaning robot from the pool, for example in order to clean the filter or store the robot when it is not being used. In addition, studies show that the robots are generally taken out by the user because they impede swimming, or for fear of the combination of water and electricity.

Extraction of the cleaning robot frequently poses problems for the user, in particular concerning the time taken for the extraction and storage of the robot which can last for more than ten minutes or so, substantial effort to be made in order to raise the robot, associated mainly with the volume of water contained, as well as winding of the cable around itself, or also problems of size when the cleaning robot is extracted from the water. The more frequently the filter must be washed, the more acute the problem becomes. Finally, the facts of having to remove the cleaning robot from its habitual storage, put it in the water, then remove it from the water at the end of the cycle and store it, lead many users to reduce their use of the robot in practice. It is therefore desirable to provide cleaning robots of this type with even greater autonomy, in particular as far as putting them into the pool or extracting them from the pool are concerned.

In order to attempt to solve this problem, devices for storage of a swimming pool robot are known, such as described for example in patent application FR 2 742 351 filed in December 1995. In this system, a device for extraction of a cleaning robot comprises a crane in a vertical position, provided at its end with a hook which is designed to cooperate with a ring supported on a cleaning robot in order to hoist it from the pool.

A system of this type is however inconvenient to use, requiring a certain amount of dexterity by the user, since the hook of the crane has to cooperate with the ring of the robot when the latter is at the level of the water line. In addition, this extraction device can be adapted only to a limited number of robots which support a hook, so as to be able to be extracted from the water by the crane. Finally, the user must be present throughout the operation, including when the cleaning robot is put back into the water.

Devices for extraction of a swimming pool cleaning robot are also known, such as the one described in the European patent application EP 2 860 329. Such a device comprises a pool cleaning robot interface like a holder system that is arranged to be coupled to the cleaning robot during an exit process including extraction of the cleaning robot from the pool, and a pool cleaning robot manipulator such as a mechanical arm, coupled to the pool cleaning robot interface and arranged to move said pool cleaning robot interface between a position wherein the robot is inside the pool and a position wherein the robot is outside the pool.

Such a device comprises a serious pool congestion disadvantage mainly due to the pool cleaning robot interface.

It is also known a device for the stowage of vessel hull cleaning robot as described in the United States patent application US 2011/0067615. This device comprises a stowage compartment for stowing the hull robot and a rotation system for rotating the stowage compartment relative to the vessel between a launch/recovery attitude and a stowed position.

The objective of the invention is in particular to eliminate some of the aforementioned disadvantages.

SUMMARY OF THE INVENTION

According to a first aspect, the invention relates to a device for extraction of a swimming pool cleaning robot.

The extraction device comprises:
a support frame;
a plate which can be deployed beyond the support frame and below the latter;
means for controlling the deployment of the plate.

It will be appreciated that the plate is designed to be placed such as to have one of its longitudinal edges placed substantially on the edge of the support frame, and the other edge placed below the surface of the water in the swimming pool.

The plate has a generally flat form, and has sufficient rigidity to support the weight of the cleaning robot during the extraction of the robot from the swimming pool. In other words, when the cleaning robot is positioned on the plate, the latter retains its generally flat form.

The plate comprises a rolling surface which is designed for rolling of the cleaning robot when the cleaning robot is extracted from the swimming pool or put into it.

According to a particular embodiment of the invention, the plate which can be deployed is a plane, and the device comprises means for moving the said plate between a retracted position, in which the said plate is substantially horizontal, and is placed above a support frame, and a deployed position, in which the plate extends from the frame and is inclined towards the exterior of the latter.

According to another embodiment, corresponding to the case of a swimming pool robot of the type which is supplied with energy by a flexible cable attached to the body of the robot, for example in its upper front part, the extraction device also comprises a cable winder, and means for controlling the cable winder. In this configuration, the extraction of the cleaning robot is facilitated by means of traction imparted to the supply cable.

According to a particular embodiment, the extraction device comprises means for controlling the return of the cleaning robot to the extraction area.

By this means, the support frame and the plate facilitate the extraction or deployment of the cleaning robot, thus, during the extraction, alleviating the force exerted on the supply cable of the robot. In addition, the supply cable then forms a means for returning the cleaning robot to the extraction area, controlled by the user.

In a particular embodiment, the plate is detachable, and the device comprises a frame which supports the cable winder, and means for moving the plate between a retracted position, in which the plate is substantially horizontal, and is placed above the frame, and a deployed position, in which the plate extends from the frame and is inclined towards the exterior of the latter. Alternatively, the plate forms a curved path, such that the angle between the surfaces tangent to its two ends is between approximately 15 and 100°. This situation corresponds to the case when the plane is placed against the vertical wall of the pool, and when the lip of the edge of the swimming pool extends towards the interior of the pool.

According to one embodiment, the plate is placed such as to be fixed between the rim of the swimming pool and its interior, optionally until it is supported on the vertical inner wall of the pool. In the case of a 90° angle, the rolling surface is thus flush with the lateral wall of the pool at one of its ends, and is parallel to the plane of the ground around the swimming pool at its other end, after being tilted.

A cleaning robot of the type which is also designed to clean the lateral walls of the pool can then engage on the rolling surface of the plate, whilst being drawn by the flexible cable, and thus, by following this path, emerge from the pool and stop horizontally, near to the edge of the latter.

According to a particular embodiment, the frame supports the cable winder, and the extraction device comprises means for guiding the plate when it is displaced between its retracted position and its deployed position.

According to one embodiment which permits connection of the cable to a supply and programming unit, the cable winder permits the output of an end of the cable during winding by the hub of the said winder.

According to another embodiment of the invention, the robot is supplied by on-board batteries, and a system which is integral with the plate can permit the coupling of a grasping means situated on the robot, in order to position the robot on the plate, and to retain it there during the phase of extraction of the robot from the swimming pool. This system, which is integral with the plate, is used in particular when the robot no longer has sufficient energy to be positioned by itself on the plate of the extraction device.

According to a second aspect, the invention relates to a device for cleaning a swimming pool, characterized in that it comprises a cleaning robot and an extraction device as described.

PRESENTATION OF THE FIGURES

The characteristics and advantages of the invention will become more apparent from the following description which describes the characteristics of the invention by means of a non-limiting example of application.

The description is based on the appended figures, in which.

DETAILED DESCRIPTION OF AN EMBODIMENT OF THE INVENTION

The context of the invention is within a swimming pool environment, for example a sunken swimming pool of the family type.

Figure 1:
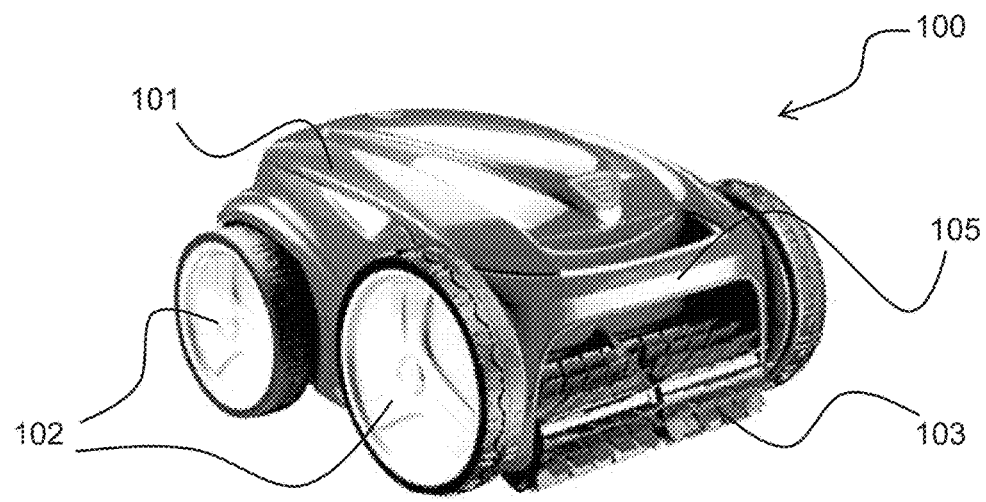
FIG. 1 illustrates a view in perspective of a swimming pool cleaning device according to the prior art.

As can be seen in FIG. 1 already referred to, a swimming pool cleaning robot 100 as envisaged here in a non-limiting manner comprises a body 101, means for displacement 102 (wheels, caterpillar bands, etc.), at least one cleaning brush 103, and a water filtering and suction circuit (not shown in the figure) comprising at least one helical wheel driven by a motor (also not shown in the figure). The means for displacement 102 can be controlled independently from one another, such as to make it possible to orient the cleaning robot freely on the walls of the swimming pool, in forward or reverse running. The running/stopping of the motor of the filtration circuit can also be controlled, and optionally so can the suction power.

For the continuation of the description, a reference $X_r, Y_r, Z_r$ is defined relative to this robot, wherein:

a longitudinal axis $X_r$ is defined as the axis of displacement of the robot when the displacement wheels 102 are commanded to move identically;

a transverse axis $Y_r$ is defined as perpendicular to the longitudinal axis $X_r$, and is situated on a plane parallel to the support plane of the means for displacement 102 of the robot, this lateral axis $Y_r$ thus being parallel to the axis of rotation of the wheels;

a vertical axis $Z_r$ is defined as perpendicular to the two other axes.

The concepts of front, rear, left, right, top, bottom, upper, lower, etc. relating to the cleaning robot are defined relative to this reference $X_r, Y_r, Z_r$.

In the present embodiment, the cleaning robot 100 concerned comprises an output shaft of the water filtration circuit oriented in a manner which is inclined relative to the vertical $Z_r$. Thus, the flow of water which is driven at the output of the filtration circuit tends to assist the advance of the robot during its displacements. According to a variant, the water output shaft is oriented according to the vertical axis $Z_r$.

In the present example, the cleaning robot 100 is supplied with energy and commands by means of a flexible cable 104. This flexible cable 104 is in this case attached to the body 101 of the robot 100 in its upper front part. This flexible cable 104 is connected at its other end to a supply and programming unit (not illustrated in FIG. 1), placed on the exterior of the pool, this supply and programming unit itself being connected to the electric current at the mains supply.

The cleaning robot 100 emits, and optionally also receives data, from and to the supply and programming unit.

The flexible cable 104, with a length of approximately 10 m or so, usually has a diameter of approximately 1 cm, and its rigidity is sufficient to allow a user to use the said flexible cable 104 in order to bring the cleaning robot 100 towards him when the robot needs to be extracted from the swimming pool.

In the present example, the cleaning robot 100 additionally comprises a grasping handle 105 which is designed to allow a user to remove the robot from the water. According to a particular embodiment, the cleaning robot comprises means which permit rapid emptying of the water contained in its inner filtration chamber when it is extracted from the water.

The cleaning robot 100 comprises, in this case in its upper part, a cover 106 which opens to allow a user to access the filter of the filtration chamber, in order to clean the filter when necessary.

The cleaning robot 100 concerned in this case has a width of approximately 40 cm, a length which is substantially equal to this, and a height of approximately 20 cm. Its weight when empty is approximately 10 kg, and approximately 25 kg when it is removed from the water with its filtration chamber not emptied.

All these dimensions and values are given here by way of non-limiting example, in order to make it possible to perceive the dimensions of an extraction/deployment device of this cleaning robot 100.

Figure 2:
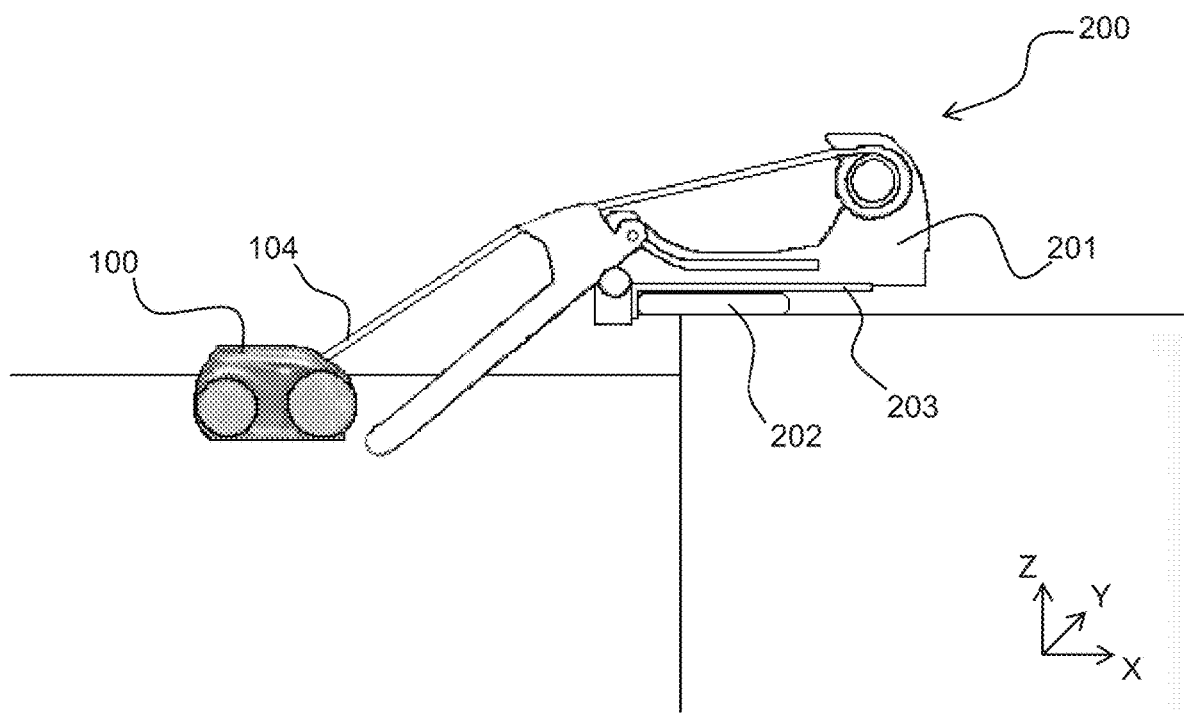
FIG. 2 is a highly schematised side view of the elements of the device, including a cleaning robot, the latter being placed in the swimming pool.
Figure 3:
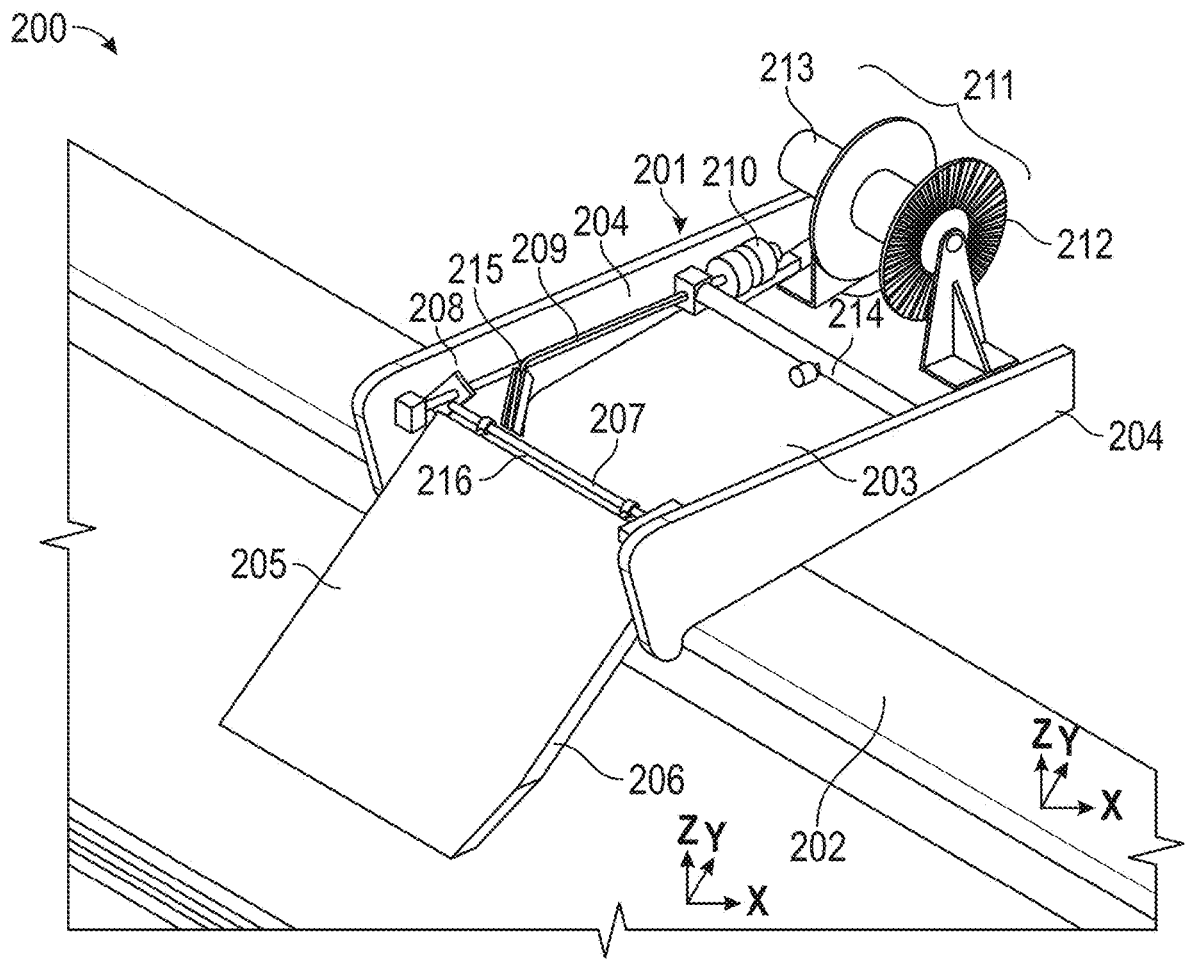
FIG. 3 is a view in perspective of the elements which constitute a device for extraction of a swimming pool robot, without the cleaning robot or winding cable.

As can be seen illustrated in a simplified manner in a non-limiting embodiment in FIGS. 2 and 3, an extraction device 200 of a swimming pool cleaning robot 100 comprises firstly a support frame 201, which is designed to be supported on the rim 202 of a swimming pool. In the present example, which is in no way limiting, this support frame 201 is a rectangular plate 203 which is 60 to 80 cm in length, provided with two, substantially vertical lateral guide edges 204. In this case, these lateral guide edges 204 have a height of approximately 15 cm.

Also in the continuation of the description, a reference XYZ is defined relating to this frame, wherein:
- a longitudinal axis X is defined as parallel to the length of the frame 201;
- a transverse axis Y is defined as perpendicular to the longitudinal axis, and situated on the plane of the ground around the frame 201;
- a vertical axis Z is defined as perpendicular to the two other axes.

The concepts front, rear, left, right, top, bottom, upper, lower, etc. relating to the support frame 201 are defined relative to this reference XYZ.

This support frame 201 receives a substantially flat rectangular plate 205, with a length which is less than the length of the frame, but is close to that length.

The width of the plate 205 is less than, or equal to, the width of the support frame 201, but is close to that width. The plate 205 can thus be placed above the frame.

The plate 205 is mobile between two positions. 1/In a first position (not illustrated in the figures), known as the retracted position, the plate 205 is positioned above the support frame 201, substantially parallel to it.

2/In a second position, known as the deployed position, the plate 205 is on the other hand placed, relative to the frame 201, overhanging the closest end of the swimming pool. In this deployed position, the plate 205 is inclined by approximately 30° relative to the horizontal. This value is non-limiting, and gradient values of 10 to 100° can be envisaged. As can be seen in FIGS. 2 and 3, in this deployed position, the plate 205 is placed such that one of its longitudinal edges is placed 10 to 20 cm below the surface of the water in the swimming pool. The inclination of the plate 205 relative to the vertical is adjustable between 0 and 100° in the present example.

In the present embodiment, the plate 205 is provided with slides 206 on its lateral edges, the said slides cooperating with lugs which form guides (not shown in the figures) fitted on the inner face of the lateral edges 204 of the frame.

Figure 4:
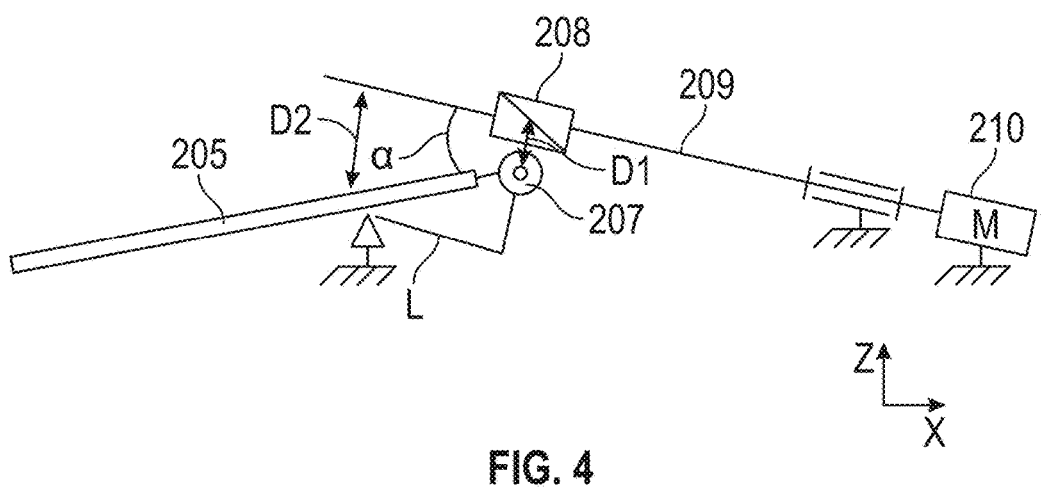
FIG. 4 is a schematic representation of the kinematics of displacement of the plate on the support frame.

The kinematics of the plate 205 relative to the support frame 201 are then illustrated in FIG. 4. As can be seen in this figure, provided here by way of non-limiting example, the plate 205 is rendered integral by means of a rotary connection 207 with a carriage 208 which is mobile along an endless screw 209 oriented approximately 10° above the longitudinal axis X. This endless screw 209 is driven by an electric motor 210. The distance D1 between the endless screw and the rotary connection 207 is less than the distance D2 between the endless screw and the lateral guide lugs of the plate 205. The distance between the guide lugs and the rotary connection according to the axis of the endless screw 209 is indicated as L.

Thus, when the endless screw 209 is rotated by the electric motor 210, it gives rise to the longitudinal displacement of the carriage 208, and consequently to the advance of the plate 205 out of the support frame 201.

The relative position of the guide lugs and the carriage determines the angle of the plate 205 relative to the axis of the endless screw 209 according to $\tan(a)=(D2-D1)/L$. It will be appreciated that the maximum and minimum angles of inclination of the plate 205 relative to the support frame 201 can thus be determined during the design of the extraction device 200.

As can be seen in FIG. 3, in the present embodiment the extraction and/or deployment device in fact comprises two endless screws 209, each placed along a lateral edge 204 of the frame. These two endless screws 209 are driven by a single motor 210, by means of a drive belt 214.

In the present example, the plate 205 also comprises a stop 216 perpendicular to its main plane, placed in the middle of its end which is closest to the rotary connection 207. This stop 216 is designed to form a displacement limit for the cleaning robot 100 on the said plate 205.

The support frame 201 additionally comprises a cable winder 211. This winder 211 comprises a reel 212 and a drive motor 213. The reel 212 is oriented according to the transverse axis Y.

This winder 211 permits the output of the flexible cable 104 along its axis, such that the cable can be connected at its end distant from the cleaning robot 100 to a supply and programming unit of the said cleaning robot.

This winder 211 is rendered integral with the plate 203 of the support frame 201 at its edge which is furthest from the pool.

At its longitudinal edge which is closest to the rotary connection 207, the plate 205 supports a cable guide 215, which is placed according to the longitudinal axis X, in the alignment of the centre of the reel 212. In the present example, this cable guide 215 has a height above the plate 205 of approximately 15 cm, this dimension being close to the height of the point of attachment of the flexible cable 104 at the level of the body 101 of the cleaning robot 100. The cable guide 215 is designed to orient the flexible cable 104 towards the reel 212 during the winding of the said flexible cable.

The extraction device 200 also comprises means for controlling the drive motor 210 of the endless screws 209 and the winder 211.

The dimensions and choice of materials which constitute the various elements previously described are determined by the forces to be absorbed, and by the conditions of the swimming pool environment.

Operating Mode

The extraction of the robot can be triggered either automatically at the end of the cleaning cycle, or manually by the user by action on the supply and control unit of the extraction system.

The supply and control unit of the extraction system is connected to the supply and programming unit of the robot, so that the motors of the extraction system and the motors of the robot are controlled in a coordinated manner.

According to a particular embodiment, the supply and control unit of the extraction system and the supply and programming unit of the robot are combined.

When a swimming pool cleaning robot 100 must be extracted from the pool, the extraction process comprises the following steps:

If the plate 205 is not initially in the deployed position, with its outer edge submerged by approximately 10 cm or so, the system commands its deployment by starting up the motor 210 which drives the endless screws 209.

Then, the winder 211 is started up, and starts to wind the flexible cable 104 which is connected to the cleaning robot 100 onto the reel 212. The robot 100 is thus brought progressively in the direction of the plate 205, with its front face oriented in the direction of the plate.

When the robot 100 reaches the immediate vicinity of the plate 205, its wheels 102 are supported on the plate, and the robot advances by itself, or is drawn by the flexible cable 104 which is being wound, until it is totally supported on the said plate. It is blocked against the stop 216 of the said plate 205.

At this moment, the wheels 102 of the robot are stopped (if its movement was still being commanded).

Figure 5:
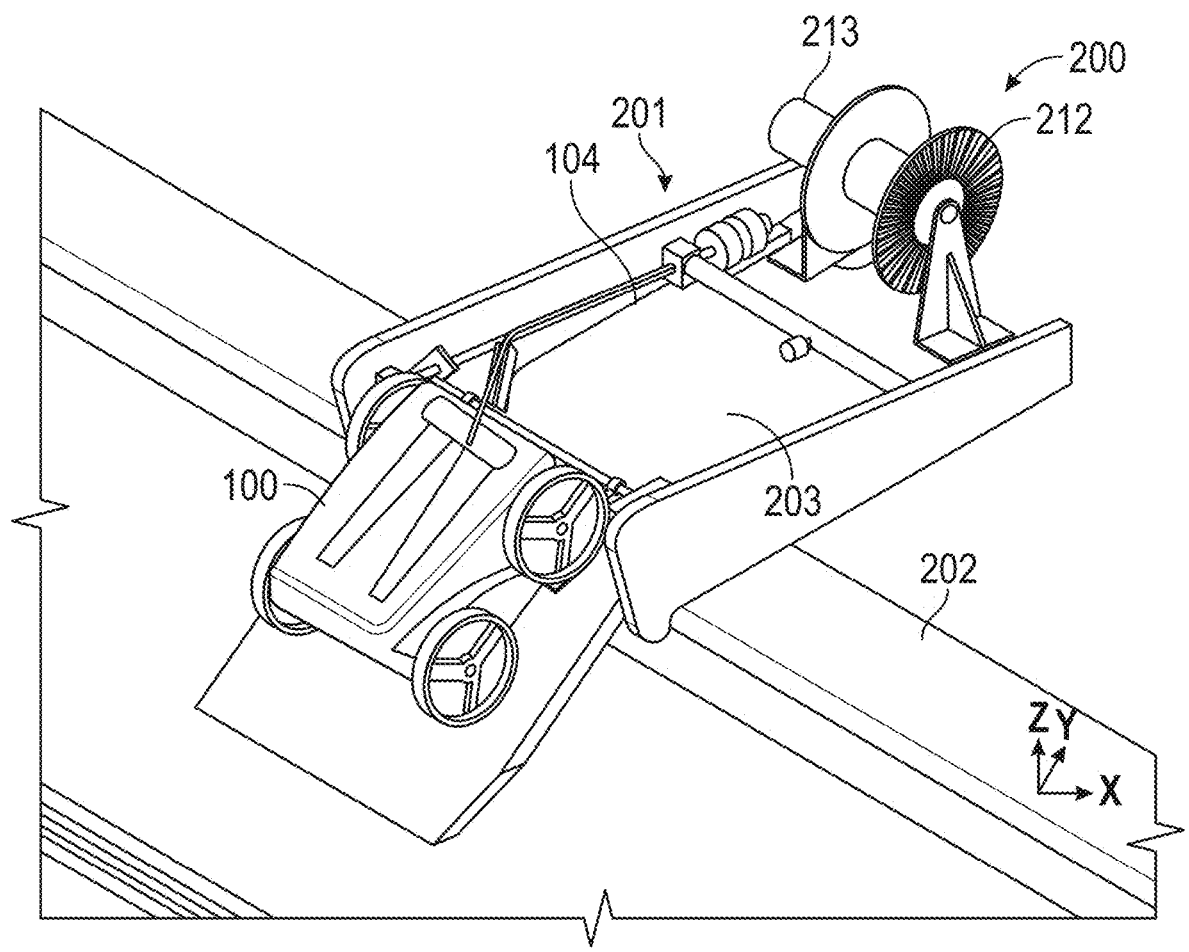
FIG. 5 is a view in perspective of the same elements, with the cleaning robot and the winding cable being represented.

The situation is then that in FIG. 5.

Then, the motor 210 which drives the endless screws 209 is started up, such as to return the plate 205 into the support frame 201. During this time, the winder 211 maintains tension on the flexible cable such as to retain the robot 100 on the plate 205.

At the same time, if the cleaning robot 100 is provided with a rapid emptying device, the latter is activated in order to reduce the weight of the water in the filtration chamber, and thus the forces exerted on the plate by the endless screws 209.

When the plate is completely retracted within the frame 201, the motors of the endless screws 209 and the winder 211 are stopped. The robot is then available for handling by the user, for example for cleaning of the filter, or simply to remain thus in the storage position before a future use. Because of the mobility of the plate and its retraction inside the device, this storage position clears the extraction device as well as the cleaning robot from the pool, without active intervention by the user. Thus, the user can have all the space available for swimming, whilst reducing the risks of injury caused by the presence of submerged elements.

Particularly advantageously, the time for extraction of the robot is relatively short, i.e. advantageously 5 minutes or less, and preferably 2 minutes or less, the user thus being able to have the pool available for swimming very quickly.

The procedure for putting the cleaning robot into the water is exactly the inverse of what has just been described, and it will be appreciated that the extraction device also acts as a device for putting into the water.

The invention claimed is:

1. A method of moving a swimming pool cleaner, comprising:
   a. supporting a support frame of an extraction device on a rim of a swimming pool above a surface of water of the swimming pool;
   b. causing an outer edge of a plate of the extraction device to be submerged below the surface of the water of the swimming pool by moving the plate relative to the support frame of the extraction device on the rim of the swimming pool from a retracted position above the surface of the water to a deployed position outwards and below the support frame and into the swimming pool;
   c. causing the swimming pool cleaner to be supported by the plate; and
   d. causing operation of a motor of the extraction device so as to reposition the plate from the deployed position to the retracted position above the support frame while supporting the swimming pool cleaner.

2. A method according to claim 1 further comprising causing operation of a winder of the extraction device so as to wind a cable to which the swimming pool cleaner is connected.

3. A method according to claim 1 in which the plate is repositioned above and substantially parallel to the support frame of the extraction device.

4. A method according to claim 1 further comprising causing operation of the motor to cease after the plate is repositioned above the support frame.

5. A method according to claim 1 further comprising activating a rapid emptying device of the swimming pool cleaner.

6. A method according to claim 1, further comprising causing movement of at least one motive element of the swimming pool cleaner to cease after the swimming pool cleaner is supported by the plate.

7. A method according to claim 1 further comprising causing further movement of the swimming pool cleaner relative to the extraction device to cease after the swimming pool cleaner is supported by the plate.

8. A method according to claim 1 in which causing the outer edge of the plate of the extraction device to be submerged within water of the swimming pool comprises causing an endless screw to be driven so as to move the plate from a retracted position above and substantially parallel to the support frame to a deployed position in which the outer edge of the plate is submerged within the water of the swimming pool.

9. A method according to claim 1 further comprising causing the support frame to be supported on a rim of the swimming pool.

10. The method of claim 1, further comprising coordinating a motor of the automatic swimming pool cleaner with the motor of the extraction device.

11. The method of claim 1, further comprising stopping wheels of the automatic swimming pool cleaner when the automatic swimming pool cleaner is fully supported on the plate in the retracted position.

12. The method of claim 1, wherein causing the swimming pool cleaner to be supported by the plate comprises causing the automatic swimming pool cleaner to advance until it is blocked against a stop of the plate while the plate is in the retracted position.

13. A method of moving a swimming pool cleaner, comprising:
   a. supporting a support frame of an extraction device on a rim of a swimming pool above a waterline of the swimming pool;
   b. causing an outer edge of a plate of the extraction device to be submerged within water of the swimming pool by causing operation of a motor of the extraction device so as to move the plate from a retracted position to a deployed position, wherein, in the retracted position, the plate is above the support frame and above the rim of the swimming pool, and wherein, in the deployed position, the outer edge of the plate extends below the rim and is submerged within the water of the swimming pool, wherein an angle of the plate relative to the support frame in the deployed position is different from an angle of the plate relative to the support frame in the retracted position;
   c. causing the swimming pool cleaner to be supported by the plate;
   d. responsive to supporting the swimming pool cleaner by the plate, causing operation of the motor so as to reposition the plate from the deployed position to the retracted position; and
   e. causing operation of the motor to cease after the plate is repositioned to the retracted position.

14. An extraction system for extracting a swimming pool cleaner from a swimming pool, the extraction system comprising:
   a support frame comprising a base and guide edges extending downwards from the base, the guide edges configured to engage an edge of a rim of the swimming pool;
   a plate comprising a first end and a second end opposite the first end, wherein the second end is submergible within water of the swimming pool, wherein the plate is movable relative to the support frame between a retracted position and a deployed position, wherein in the retracted position, the plate is above the support frame, and wherein, in the deployed position, the plate extends away from the support frame, wherein an inclination of the plate relative to vertical is adjustable between 0 and 100°; and
   a motor for controlling movement of the plate relative to the frame between the retracted position and the deployed position.

* * * * *